Aug. 8, 1961 L. D. SCHMIDT 2,995,026
AUTOMATIC SAMPLING, SCREENING AND TESTING
THE STRENGTH OF SOLID MATERIALS
Filed Feb. 5, 1960 5 Sheets-Sheet 1
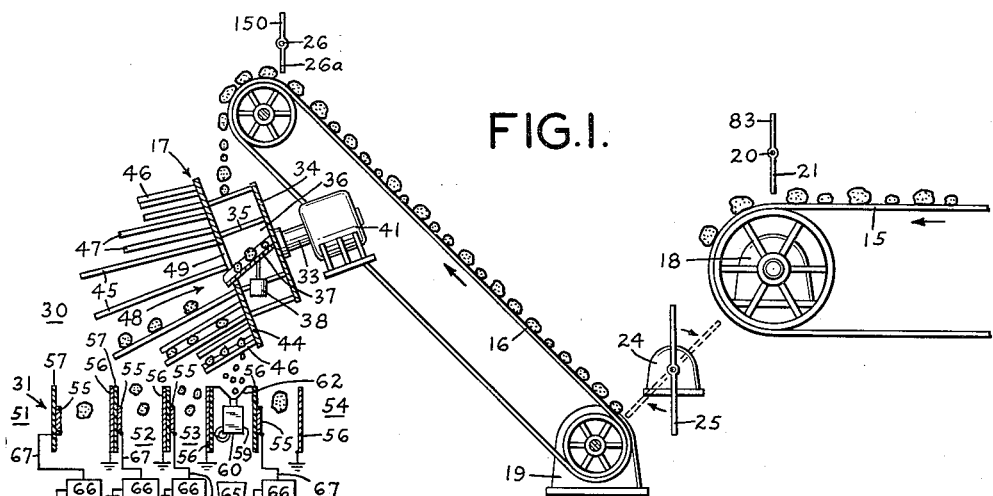
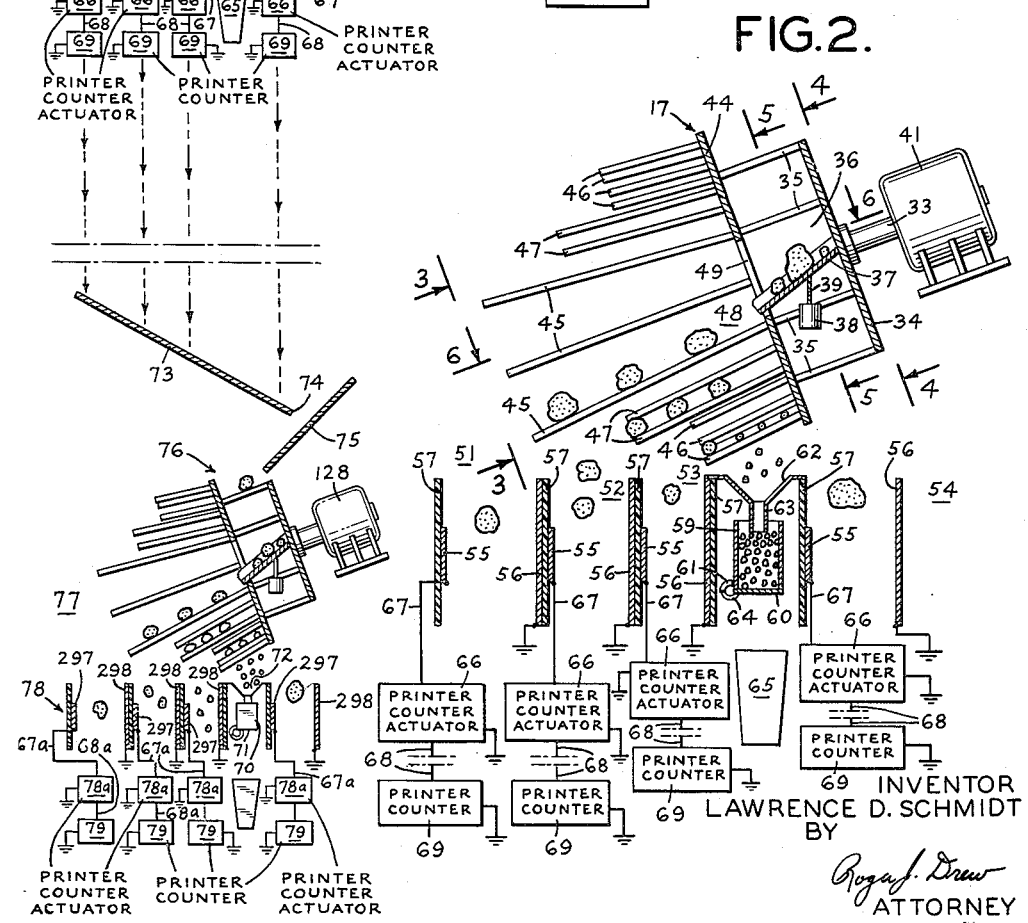
INVENTOR
LAWRENCE D. SCHMIDT
BY
Roger J. Drew
ATTORNEY

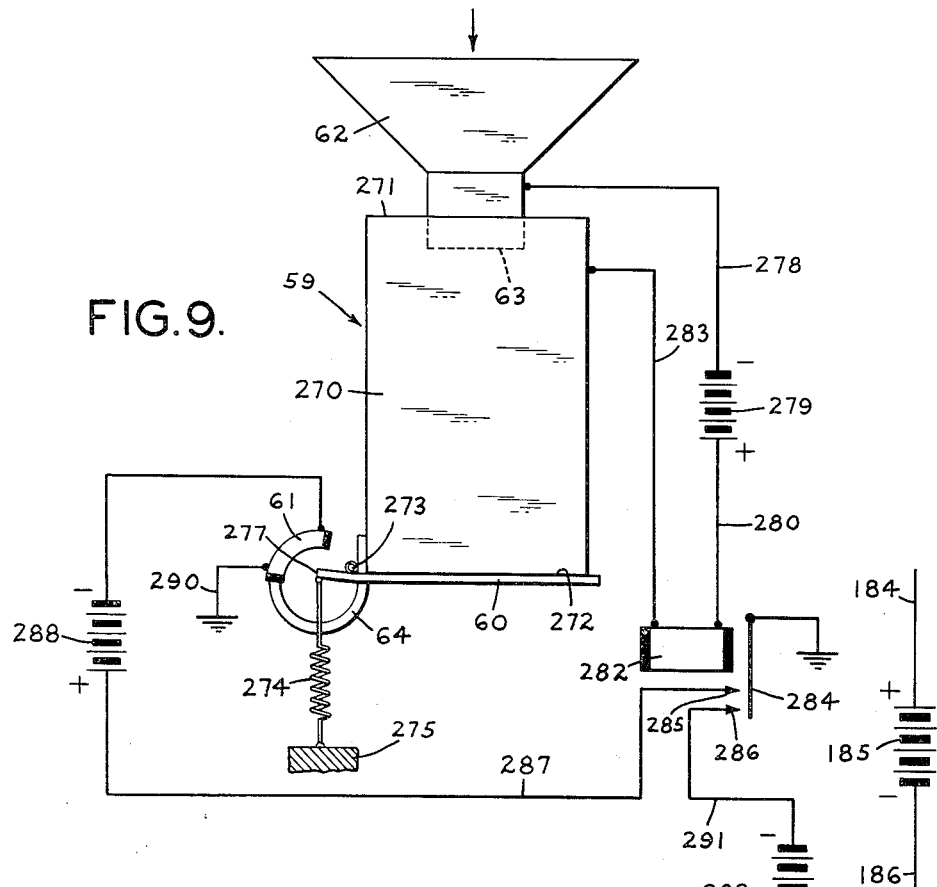

Aug. 8, 1961         L. D. SCHMIDT         2,995,026
AUTOMATIC SAMPLING, SCREENING AND TESTING
THE STRENGTH OF SOLID MATERIALS
Filed Feb. 5, 1960                5 Sheets-Sheet 3

INVENTOR
LAWRENCE D. SCHMIDT
BY
Roger J. Drew
ATTORNEY

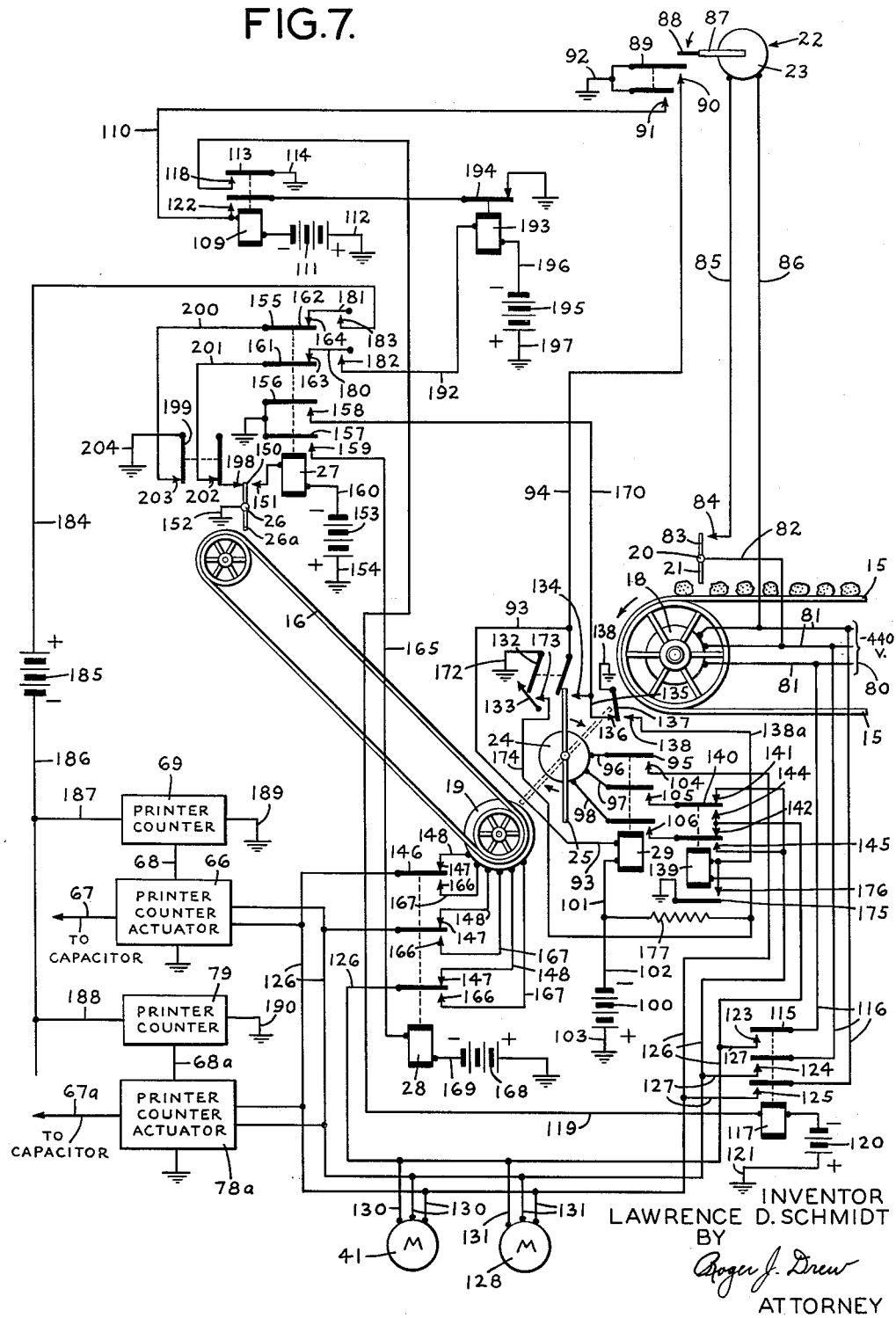

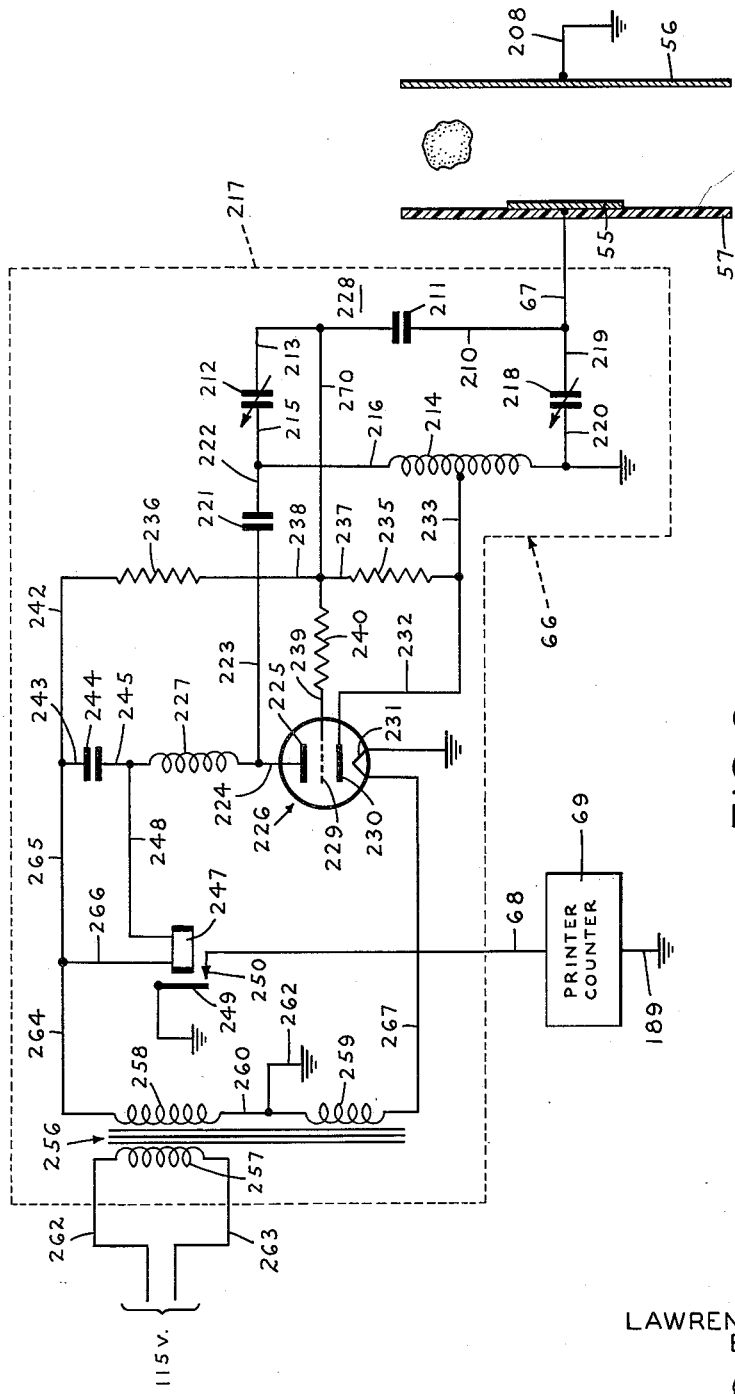

United States Patent Office 2,995,026
Patented Aug. 8, 1961

2,995,026
AUTOMATIC SAMPLING, SCREENING AND TESTING THE STRENGTH OF SOLID MATERIALS
Lawrence D. Schmidt, New York, N.Y., assignor to Allied Chemical Corporation, New York, N.Y., a corporation of New York
Filed Feb. 5, 1960, Ser. No. 6,929
9 Claims. (Cl. 73—12)

This invention relates to testing the strength of solid material and more particularly to the automatic sampling, screening and testing of the strength of solid material pieces, for instance coke pieces.

Evaluation of the quality of coke, especially foundry coke, has been unsatisfactory heretofore for the reason that it has necessarily depended largely upon visual inspection, and hence has not been conclusive but has resulted in virtually endless controversy between producers and consumers. Recently this controversy has become increasingly acute because of the growing realization that size of coke and its ability to maintain its size under handling is critically important to users, indeed much more important than other qualities, such as carbon content, etc., in the ranges ordinarily met in commercial practice.

Further, the American Society for Testing Materials shatter test (D 141–48) has been widely used heretofore to determine the strength and size stability of commercial coke. However, this test is unsatisfactory for the reasons that it is not carried out on a truly representative sample of coke and hence does not give an accurate measurement of the strength of the coke. The A.S.T.M. recommendation as to the coke sample to be tested is that about 75 pounds of pieces of by-product coke of such size that no piece will in any position pass through a two inch square-mesh sieve shall be selected from the coke wharf for each test. The pieces selected shall be approximately equal in length to one-half the width of the coke ovens, and shall show a "cauliflower" end produced at the walls of the ovens and an "inner" end produced at the center of the ovens. Admittedly, these selected large coke pieces are not representative of the coke since most of the coke pieces are considerably smaller than the half-oven width specification. Further, the selection and handling of the samples of large coke pieces has heretofore been accomplished by hand, and this hand sampling is expensive due to high labor costs.

Other materials in which the size of the material and its ability to maintain its size is important include, for example, sintered or pelleted ores, coal and iron ore.

One object of this invention is to provide for testing and strength of solid material in which size stability is important, for instance coke, by a procedure which obviates controversy with respect the results.

Another object is to provide for the sampling, screening and strength testing of the solid material by a completely automatic, unattended procedure.

Another object is to provide for the practical obtaining for strength testing of large samples of coke that are truly representative of tonnage coke production.

A further object is to provide for the obtaining of representative samples of the solid material and the strength testing of the pieces in an economical and efficient manner.

A further object is to provide a screening device for the automatic and efficient separation of the solid material pieces into various size fractions.

Additional objects and advantages will be apparent as the invention is hereafter described in greater detail.

In accordance with the present invention the apparatus comprises a first station including screening means for separating a sample of the solid material pieces being tested into various size fractions, means for instance a conveyor for supplying a representative sample of the pieces from a supply thereof to the screening means for the separating, and means for determining the quantity of solid pieces of the separate size fractions falling from the screening means, for instance electrical counting means. A hard-surfaced member, for instance a metallic plate is located a substantial distance beneath the quantity determining means for subjecting solid pieces falling therefrom to sudden impact stresses. A second station including another screening means is provided for separating the solid pieces falling from the hard-surfaced member into various size fractions similar to the size fractions from the first station screening means and another quantity determining means is provided for determining the quantity of solid pieces of the separate size fractions falling from the second station screening means. Comparison of the quantity of pieces in the size fractions from the first and second screening stations is related to the strength of the solid material.

In a preferred embodiment of the apparatus, a deflector plate is automatically movable into and out of a sampling position under the end of an endless conveyor for the solid material pieces for diverting the total flow of pieces, i.e. a representative sample, from this conveyor onto a two-speed elevator conveyor, the elevator conveyor supplying the sample of pieces to the screening means of the first station for separation into the various size fractions. Rotary screening devices hereafter described preferably constitute the screening means of the first and second stations, operation of the first and second station rotary screening devices being started automatically when a detecting member mounted above the upper end of the elevator conveyor is moved upwardly by a piece of the solid material on the conveyor to engage a contact whereby a relay is actuated and a switch controlled by the relay is closed. Upward movement of the detecting member by engagement with the solid material piece also results in slowing down of the elevator conveyor to run at its slower speed and movement of the deflector plate to its non-sampling position. When all of the solid material pieces on the elevator conveyor have been delivered to the first station rotary screening device, the detecting member engages another contact which results in stopping of the rotary screening devices and elevator conveyor, printing of the readings of the counters hereafter described, and resetting of the counters to zero.

The quantity determining means for the first and second screening stations preferably comprise electrical counting means comprising electrical capacitors electrically connected by circuit means including an electronic relay circuit to a printer-counter device. Gravitational fall of the solid material pieces of each size fraction from the rotary screening device (of each screening station) between the appropriate spaced apart charged plates of each capacitor results in changing of the capacitance of each capacitor, which so affects the circuit means including the electronic relay circuit as to cause the printer-counter to count the pieces of each size fraction falling between the capacitor plates and at the end of the test period to print the total for each fraction on a tape.

While the present invention gives excellent results when used for testing the strength of coke, it can also be used to advantage for testing the strength of other materials including the materials previously mentioned in which size stability of the material during handling is of consequence or importance.

In the drawings:

FIG. 1 is an elevational view partly in section of the apparatus of the present invention.

FIG. 2 is an enlarged elevational view partly in section of one of the screening devices and counting means of the apparatus of FIG. 1.

FIG. 3 is a view taken on line 3—3 of FIG. 2.

FIG. 7 is a diagram showing electrical circuitry of the automatic sampling, screening and strength testing apparatus of the present invention.

FIG. 8 is a circuit diagram of the electrical and electronic devices of automatic printer-counter means of the present invention, the printer-counter actuator being shown in detail.

FIG. 9 is an enlarged detail view of apparatus including electrical circuitry of the invention for determining the quantity of solid material pieces of the smallest size fraction.

Figure 4:
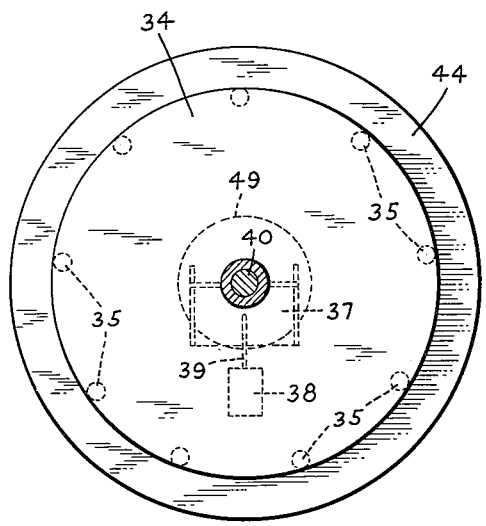
FIG. 4 is a transverse section taken on line 4—4 of FIG. 2.
Figure 5:
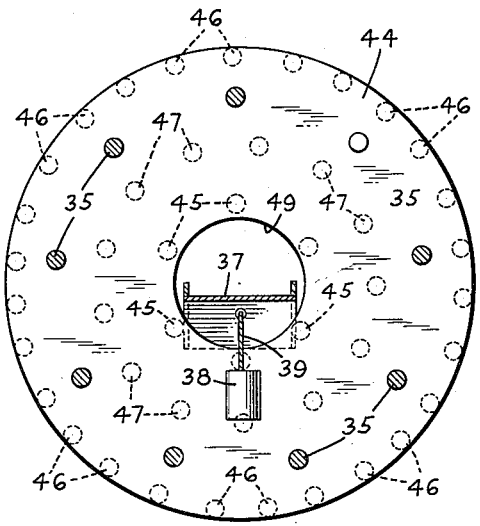
FIG. 5 is a transverse section taken on line 5—5 of FIG. 2.
Figure 6:
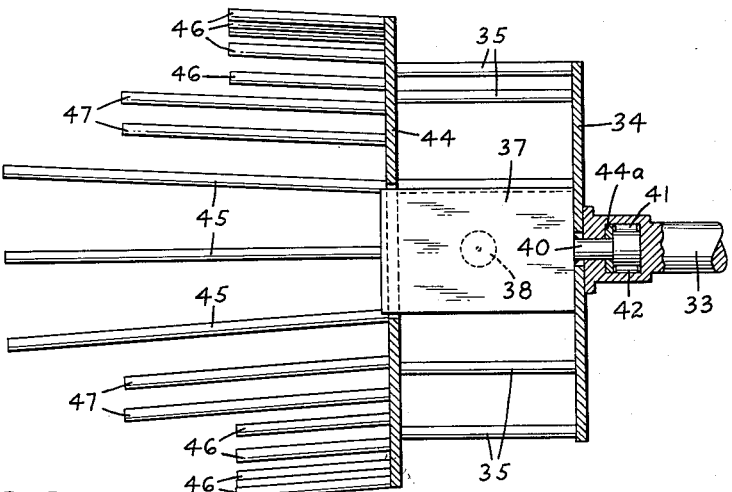
FIG. 6 is a plan view in section taken on line 6—6 of FIG. 2.

Referring to FIGS. 1–6 of the drawings which show a specific embodiment of the invention, horizontal endless belt conveyor 15 for carrying the material to be tested, for instance coke pieces, has its discharge end spaced adjacent the lower end portion of upwardly inclined endless belt conveyor 16 which elevates a sample of the solid pieces for feeding onto the widest spaced apart bars of rotary screening device 17 of a first screening station. Motor 18 drives conveyor 15 and two-speed motor 19 drives elevator belt conveyor 16. Detecting flap 20 is pivotally mounted over the discharge end portion of conveyor 15 and has flap end portion 21 in predetermined closely spaced relation thereto and movable by solid pieces thereon. Timer 22 shown in FIG. 7 includes timer motor 23 in circuit with flap 20 for operating two-speed motor 19 and hence elevator conveyor 16 at a faster speed and separate drive motors for first station rotary screening device 17 and second station rotary screening device 76 hereafter described, and for starting operation of reversing motor 24 for moving deflector plate 25 from its vertical position into its inclined sampling position (shown in broken lines) when (1) the solid pieces engage flap end portion 21 and move the flap 20 to close the circuit, and (2) electric current is being delivered to drive motor 18 of conveyor 15. The circuitry of the apparatus and its operation is hereafter described in detail.

Deflector plate 25 is pivotally mounted on the reversing motor shaft between the lower end portion of elevator conveyor 16 and the discharge end of horizontal conveyor 15, the last-mentioned conveyor supplying the solid material pieces from a source of supply thereof. When deflector plate 25 is in the inclined broken line sampling position, all solid material pieces, for instance coke pieces including varying large, small and intermediate size pieces discharging from conveyor 15 are diverted onto the lower end portion of elevator belt conveyor 16. Hence the apparatus including deflector plate 25 makes a truly representative sampling of the coke for subsequent strength testing, and does not sample only the larger pieces for the strength testing which is inconclusive and leads to controversy. Elevator conveyor 16 is run at its faster speed during the sampling of solid material pieces discharging from conveyor 15 by deflector plate 25, to avoid piling up of the pieces on the conveyor 16 and interference with the sampling which would occur at lower speeds of operation with attendant falling of pieces from the conveyor 16 and delivery of non-representative samples to the screening stations.

Flap 26 is pivotally mounted over the upper end portion of elevator conveyor 16 and has end 26a in predetermined closely spaced relation to the conveyor and movable by solid pieces thereon. Relay 27, which is a conventional slow release relay, is operable under the control of flap 26, and relays 28 and 29 are operable under the control of relay 27, the relays and their operation being shown in FIG. 7 and hereafter described in detail. Elevator conveyor two-speed motor 19 and deflector plate reversing motor 24 are operable under the control of relays 28 and 29 respectively. When flap end portion 26a is engaged and moved by a solid piece on elevator conveyor 16, a circuit is closed resulting in energizing of relay 27 and hence energizing of relays 28 and 29 to cause two-speed motor 19 and hence elevator conveyor 16 to operate at its slower speed and reversing motor 24 to move deflector plate 25 out of its inclined sampling position. Elevator conveyor 16 is operated at its slower speed when full of solid pieces so as to enable delivery of the pieces to the bars of a first station rotary screening device in a slower and more gentle and easy to handle manner, whereby bouncing and piling up and falling of the pieces from the bars without being screened is avoided.

A first screening station indicated generally at 30 comprises a rotary screening device 17. Rotary screening device 17 comprises downwardly inclined rotatable drive shaft 33, disk 34 mounted at the undriven end of the shaft with the axis of rotation of the shaft perpendicular to the plane of the disk, and a plurality of widest spaced apart parallel bars 35 mounted at their ends in circular arrangement at the marginal edge portion of the disk opposite surface and perpendicular to this surface. By reason of being downwardly inclined as shown, rotary screening device 17 and the other rotary screening device hereafter disclosed are self-cleaning. Bars 35 project from disk 34 to form an annular barrier defining a chamber 36 therewithin. Bars 35 are each typically about 16 inches in length, spaced apart typical distance of about 12 inches, and as shown are circular in cross section. The solid pieces discharged from the upper end of elevator conveyor 16 fall onto the outer surfaces of bars 35 with the larger size pieces being retained on the bars and the smaller size pieces passing therebetween and into chamber 36 to be received by chute 37. Chute 37 is provided with counterweight 38 affixed thereto by rod 39. As shown in detail in FIG. 6, chute 37 is affixed to stub shaft 40 which is journaled within drive shaft 33, roller bearings being designated at 41 and 42 and a thrust bearing at 44a. Drive shaft 33 and hence the rotary screening device is rotated by motor 41, chute 37 remaining in its inclined delivering position during the rotation of drive shaft 33 by reason of stub shaft 40 journaled in bearings 41 and 42 and counterweight 38. Rotary screening device 17 and the rotary screening device of the second station hereafter described are rotated at a speed of typically about 10–60 r.p.m.

Disk 44 is mounted at the opposite end of bars 35 with the bars perpendicular to the plane of such disk. A plurality of spaced apart straight bars are mounted at their ends at the opposite surface of disk 44, such bars being mounted and projecting from disk 44 in such manner as to form inner and outer concentric circular barriers and an intermediate barrier spaced between the inner and outer barrier. The bars 45 of the inner barrier are widely spaced apart but narrower spaced than widest spaced bars 35, the bars 46 of the outer barrier being most narrowly spaced apart, and the bars 47 of the intermediate barrier being spaced apart a distance and having a length intermediate the distance of spacing and the length respectively of the inner and outer barrier bars. A receptacle 48 is defined by the inner barrier of bars 45, inlet opening 49 being provided for receptacle 48 in disk 44 for introduction of smaller size solid pieces from chute 37 into the receptacle. The bars of each of the inner, intermediate and outer barriers are spaced closer together at the inlet extremity of receptacle 48 than at their opposite extremity. Bars 45 forming the inner barrier each have typical length of about 3 feet and are spaced apart at the inlet extremity typical distance of about 8 inches and at their opposite extremity typical distance of about 9 inches. Bars 47 of the intermediate barrier each have typical length of about 2 feet, and are spaced apart at the inlet extremity typical distance of about 5 inches and at their opposite extremity typical distance of about 6 inches. Bars 46 forming the outer barrier each have typical length of about 1 foot, and are spaced apart at the inlet extremity typical distance of about 3 inches and at their opposite extremity typical distance of about 4 inches. As shown, bars 45, 46 and 47 are circular in cross section. If desired or required, rings or other suitable reinforcing members can be affixed to the end portions of bars 45, 46 and 47 for purpose of reinforcement. The solid pieces of varying sizes delivered into receptacle 48 by chute 37 are separated by rotary screening device 17 into fractions of different sizes corresponding to the spacing between the bars of each barrier, screening device 17 being positioned above capacitors of counting means 31, hereafter described, in such manner that the inner, intermediate and outer barrier bars 45, 47 and 46 respectively will discharge from their terminal ends the solid pieces of the different size fractions exclusive of the smallest size fraction with the pieces of each size fraction falling between a pair of spaced apart charged plates of the capacitor corresponding to the particular size fraction pieces to be counted. The smallest size fraction pieces fall between the most narrowly spaced bars 46 of the outer barrier and are collected with the aid of a funnel in a solenoid-operated drop-bottom container hereafter described for determining the quantity of the smallest size fraction pieces. Rotary screening device 17 is constructed of ferrous metal, for instance steel.

Counting means 31, shown in FIGS. 1 and 2, comprises capacitors 51, 52, 53 and 54 shown side by side each including a pair of metallic plates 55 and 56 located beneath rotary screening device 17. Plates 55 each have typical dimensions of length of about 2 feet and width of about 10 inches, and plates 56 each have typical length of about 3 feet and width of about 1 foot. Plates 55 and 56 of each capacitor are spaced apart a typical distance of from about 1–2 inches greater than the size or greatest dimension of the particular pieces they are to count. Non-conductive boards 57 of wood or other electrical insulating material support plates 55 and 56 of the capacitors. The spaced apart plates of capacitors 51, 52 and 53 are positioned beneath the terminal ends of respectively inner barrier bars 45, intermediate barrier bars 47 and outer barrier bars 46; and the spaced apart plates of capacitors 54 are positioned beneath the widest spaced apart bars 35 of the screening device. The various size fraction pieces falling and rolling on the bars of the inner, intermediate and outer barriers fall from their terminal ends and are directed to pass between the charged plates of capacitors 51, 52 and 53, whereby the pieces of each fraction are counted as hereafter described. The largest size pieces retained on bars 35 fall from the bars downwardly between the charged plates of capacitor 54 whereby they are counted.

Metallic container 59 (shown in more detail in FIG. 9) having solenoid-operated dump door 60 hinged to the lower portion of the container side wall and constructed and operating as hereafter described in detail, is disposed beneath the narrowest spaced outer barrier bars 46 a similar distance as the capacitors for collecting the smallest size fraction pieces falling between bars 46 (i.e. not discharging from the ends of bars 46) and determining the quantity of pieces in this smallest size fraction. The solenoid is designated at 61. Metallic funnel 62 is located directly above container 59 and has a lower tubular portion 63 extending a short distance into container 59 with the funnel lower tubular wall spaced from the container side wall. Funnel 62 is in electrical circuit with container 59 and catches the smallest size fraction pieces and conducts the same into container 59, the pieces accumulating in the container to ultimately bridge the gap between the wall of the funnel lower tubular portion 63 and the container side wall to close the circuit to energize a relay thereby energizing solenoid 61. The energized solenoid 61, which is of arcuate shape, draws magnetizable metallic rod 64 therewithin, rod 64 also being of arcuate shape and affixed at one end to the lower surface of dump door 60, whereby door 60 is opened against the action of a spring normally maintaining the door in closed position. Simultaneously with the opening of dump door 60, a printer-counter device 293 (shown in FIG. 9) is operated to count the number of times container 59 is filled with the smallest size pieces. With dump door 60 opened, the solid pieces fall from container 59 and are collected in receptacle 65 for discarding or disposition as desired. Printer-counter 293 prints the total number of times container 59 is filled with the smallest size pieces and is reset to zero at the close of the test period by reason of circuit means including relay 27 hereafter described.

Capacitors 51, 52, 53 and 54 are electrically connected to printer-counter actuators 66 which include electronic relay circuits, shown in detail in FIG. 8 and their structure and operation hereafter described. Smaller plates 55 of the capacitors are connected to the printer-counter actuator by wires 67 while larger plates 56 are grounded. Printer-counter actuators 66 are also grounded and electrically connected by wires 68 to printer-counters 69 which operate to count and record at the end of the test period by printing on a tape the number of solid pieces of each fraction that have fallen between the spaced apart plates of each capacitor. Printer-counters 69 are conventional equipment obtainable as model "ZDGII" from the Presin Company of Santa Monica, California.

Inclined metallic plate 73 is positioned a distance of about 20–30 feet, preferably about 24 feet, beneath the spaced apart plates 55 and 56 of the capacitors of counting means 31, for receiving the solid pieces falling from these capacitors and subjecting the same to sudden impact stresses. Plate 73 is preferably of ferrous metal, for instance steel, and has typical length of about 8 feet and width of about 6 feet. The pieces fall over lower edge 74 of plate 73 and are conducted by guide plate 75 onto the widest spaced apart bars of another rotary screening device 76 of a second screening station 77. Rotary screening device 76 has structure substantially identical to that of rotary screening device 17 and operates in a substantially identical manner as does screening device 17, to separate the coke pieces falling from inclined plate 73 into various size fractions similar to the size fractions from rotary screening device 17. Motor 128 rotates screening device 76.

Counting means 78 substantially identical to counting means 31 are provided and include the capacitors each having a pair of spaced apart plates 297 and 298 disposed beneath the bars of second station rotary screening device 76 in manner substantially identical to the location of plates 55 and 56 of the first-mentioned capacitors beneath the bars of first station rotary screening device 17. Smallest plates 297 of the capacitors are electrically connected by wires 67a to printer-counter actuators 78a substantially identical to printer-counter actuators 66, larger plates 298 of the capacitors being grounded. Printer-counter actuators 78a are electrically connected by wires 68a to printer-counters 79 substantially identical to printer-counters 69 for counting and recording at the end of the test by printing on a tape the number of solid pieces of each size fraction that fell between the spaced apart plates of each capacitor. Metallic container 70 having a solenoid operated dump door 71 and substantially identical in structure and operation to container 59 is located beneath the most narrowly spaced outer bars of the second station rotary screening device 76 for receiving and determining the quantity of smallest size pieces falling therefrom. Metallic funnel 72 in circuit with container 70 conducts the pieces into container 70. A printer-counter device, substantially identical in structure and operation to printer-counter 293, shown in FIG. 9, is provided for counting and recording at the end of the test period by printing the number of times container 70 is filled with the smallest size fraction pieces.

Referring now to FIG. 7 showing the circuitry of the automatic sampling, screening and strength testing apparatus of this invention, power source 80 such as a 440 volt alternating current three phase power source is connected to drive motor 18 for belt conveyor 15 by power lines 81. These power lines 81 are typically actuated manually by a coke plant operator when coke is to be conveyed from the coke wharf. Detecting flap 20 is mounted a predetermined distance above solid material piece conveyor 15, line 82 connecting upper metallic portion 83 of the flap with one of power lines 81. Fixed contact 84 is connected to timer motor 23 of timer 22 by line 85. Timer motor 23 is connected by line 86 to another of power lines 81. As shown, flap lower end portion 21 is located a sufficient distance above conveyor 15 to be deflected by the larger size solid material pieces, for instance, foundry coke pieces, and to allow smaller pieces, for instance furnace coke pieces to pass thereunder without deflecting flap end portion 21. Flap lower end portion 21 has sufficient flexibility so as not to impede the travel of the solid pieces. If desired to detect smaller size pieces, flap 20 would be mounted closer to belt conveyor 15.

Timer 22 has motor 23 and arm 87 which rotates in counterclockwise direction, flexible flap 88 being provided at the end of arm 87. The timer is conventional equipment obtainable in commerce. Timer motor 23 operates when (1) flap lower end portion 21 is deflected upwardly by a solid piece on conveyor 15 whereby upper metallic portion 83 of the flap is moved to engage contact 84, and (2) drive motor 18 of conveyor 15 is receiving power and operating. Upper metallic portion 83 of flap 20 is in contact with fixed contact 84 as long as pieces are contacting and deflecting flap lower end portion 21. In operation, timer motor 23 moves arm 87 in counterclockwise rotation whereby flap 88 engages and moves double pole switch 89 downwardly into momentary engagement with fixed contacts 90 and 91. This momentary closing of switch 89 starts a cycle of operation of the sampling, screening and testing apparatus of this invention as hereafter described. Typically arm 87 will make one revolution per hour when power lines 81 are continually delivering power and contact 84 is continually being closed. Switch 89 is connected to ground by wire 92 and is pivotally mounted on hinges as are the other switches of this invention.

Relay 29 is connected to contact 90 by lines 93 and 94 and actuated momentarily by switch 89. Triple pole switch 95 is actuated by relay 29 and connected by lines 96, 97 and 98 to reversing motor 24 which operates deflector plate 25 to move this deflector plate from its vertical non-sampling position to its inclined sampling position shown in broken lines for taking a representative sample of solid material, for instance coke pieces. Motor 24 as well as the other motors of this invention, exclusive of timer motor 23, are 440 volt three phase alternating current induction motors. Relay 29 is also connected to battery 100 by wires 101 and 102, the battery being in turn grounded by wire 103. Momentary closure of double pole switch 89 energizes relay 29 which effects closing of triple pole switch 95 by causing the same to move into engagement with fixed contacts 104, 105 and 106, closing of switch 95 causing reversing motor 24 to start clockwise movement of deflector plate 25 toward sampling position to take the sample of solid material pieces as described.

Relay 109 is connected to contact 91 by wire 110, this relay also being connected to battery 111 which in turn is grounded by wire 112. Double pole switch 113 is actuated by relay 109 and connected to ground by wire 114, and switch 113 stays locked down through contact 122 and switch 194 until relay 193 is actuated later in the cycle. Triple pole power switch 115 is joined by 440 volt three phase alternating current power lines 116 to power lines 81. Relay 117 controls switch 115 and is connected to fixed contact 118 of double pole switch 113 by wire 119, relay 117 also being connected to battery 120 which in turn is grounded by wire 121. When triple pole switch 95 is closed by the momentary closing of double pole switch 89 as described, double pole switch 113 is closed by being drawn into engagement with fixed contacts 118 and 122 by reason of the energized relay 109, and triple pole switch 115 is also closed by being drawn into engagement with fixed contacts 123, 124 and 125 by energized relay 117. Such engagement of switch 115 with contacts 123, 124 and 125 results in energizing of 440 volt three phase alternating current power line 126 by connecting lines 127. Closing of switch 113 results in locking of this switch in closed position as described until the end of the sampling and testing cycle, and also effects keeping switch 115 closed whereby electrical power is delivered to motors 41 and 128 which drive the rotary screening devices previously described to the first and second screening stations and power is also delivered to printer-counter actuators 66 and 78a and to their respective printer-counters 69 and 79. Drive motors 41 and 128 are kept in continuous operation during the remainder of the cycle. Motors 41 and 128 are joined to three phase alternating current power lines 126 by lines 130 and 131 respectively.

As soon as motor 24 and hence deflector plate 25 starts rotating in clockwise direction, double pole switch 132 which was previously pushed by deflector plate 25 into engagement with armature 133 swings to the right to engage contact 134 thereby energizing relay 29 to keep triple pole switch 95 closed and hence motor 24 in operation. Completion of the circuit is provided through ground through wire 135, fixed contact 136, switch 137 and wire 138 connected to ground, switch 137 normally engaging contact 136. Motor 24 turns deflector plate 25 to its inclined sampling position shown by the broken line. When deflector plate 25 reaches its sampling position, it mechanically operates switch 137 by pushing against the same to swing switch 137 out of engagement with contact 136 thereby breaking the last-mentioned ground circuit. With the ground circuit broken, relay 29 is de-energized and triple pole switch 95 opens whereby motor 24 stops. Deflector plate 25 stays in its inclined sampling position (shown in broken lines) once it arrives there until the solid material pieces arrive at the top of inclined belt conveyor 16.

Deflector plate 25 upon arriving at its broken line sampling position pushes switch 137 into engagement with fixed contact 138 connected to relay 139 by wire 138a causing energizing of relay 139, whereby double pole reversing switch 140 is drawn downwardly out of engagement with fixed contacts 141 and 142 and into engagement with fixed contacts 144 and 145 and switch 175 is drawn upwardly into engagement with fixed contact 176. Contacts 144 and 145 are connected to power lines 126 and contact 176 is connected to wire 138a. The engagement of switch 140 with contacts 144 and 145 provides for the ultimate reversing operation of motor 24 and hence counterclockwise movement of deflector plate 25 back to its vertical position (shown in solid lines). Switch 140 locks down by engagement of armature 175 with contact 176 thereby keeping motor 24 in reverse connection but inoperative at this time. Locked down switch 140 is thus ready to start operation of reversing motor 24 to return deflector plate 25 to its vertical non-sampling position when switch 95 is subsequently closed.

With deflector plate 25 still in its inclined sampling position, the solid material pieces discharging from the end of conveyor 15 are conducted by this deflector plate onto the lower portion of elevator conveyor 16, for elevating to the rotary screening device 17 (shown in FIG. 1) of the first screening station. All solid pieces, for instance coke pieces are deflected from conveyor 15 onto elevator conveyor 16 for a short period until the belt of conveyor 16 is full of pieces. Sampling conveyor belt 16 takes the full rate of production at the coke plant for a short time thus ensuring a representative sample of coke of tonnage coke plant production, as contrasted with the non-representative sample comprising only the larger coke pieces of the prior art strength testing.

Two-speed motor 19, which is conventional equipment and obtainable in commerce drives elevator conveyor 16 and is operating at its high speed of typically 900 r.p.m. when elevator conveyor 16 carries the solid material sample pieces. Current is supplied to motor 19 for this high speed operation through power lines 126 and triple pole double throw switch 146, switch 146 being in engagement with upper fixed contacts 147. Contacts 147 are connected to motor 19 by wires 148. The solid material pieces are carried upwardly by elevator conveyor 16 and when a piece reaches detecting flap 26 mounted over the upper portion of conveyor 16, the flap is lifted by the piece and the upper metallic portion 150 of the flap is moved out of engagement with contact 198 of double pole switch 199 and into engagement with fixed contact 151 thereby energizing slow release relay 27 and causing counterclockwise movement of the deflector plate 25, slowing down of two-speed motor 19 and hence conveyor 15 and start up of the rotary screening devices of the first and second screening stations as hereafter described. Wires 200 and 201 lead from switch 155 hereafter described to contacts 202 and 203. Metallic portion 150 of flap 26 is connected to ground through wire 152, and relay 27 is connected to battery 153 by wire 160, battery 153 being connected to ground through wire 154. The energized relay 27 draws four pole switch 155 downwardly, the two lower armatures 156 and 157 of switch 155 moving into engagement with fixed contacts 158 and 159 respectively, and the two upper armatures 161 and 162 of switch 155 moving out of engagement with contacts 163 and 164 respectively.

Engagement of bottom armature 157 of switch 155 with fixed contact 159, which is connected to relay 28 by wire 165 energizes relay 28 drawing triple pole double throw switch 146 downwardly out of engagement with upper contacts 147 and into engagement with lower fixed contacts 166 connected to two-speed motor 19 by wires 167, causing motor 19 to operate at its lower speed of typically 450 r.p.m. Relay 28 is connected to battery 168 by wire 169, battery 168 being connected to ground. Engagement of next to the lowest armature 156 of four pole switch 155 with contact 158, which contact is joined to wire 135 by wire 170 (switch 132 being in engagement with contact 134 at this time) results in energizing of relay 29 and closing of triple pole switch 95 by engagement with contacts 104, 105 and 106. Closing of switch 95 starts operation of motor 24 in counterclockwise rotation thereby returning deflector plate 25 from its inclined sampling position to its vertical non-sampling position. Return of deflector plate 25 to its non-sampling vertical position causes opening of switch 132 by reason of deflector plate 25 pushing against switch 132 and forcing it out of engagement with contact 134. With switch 132 out of engagement with contact 134, the circuit is broken and no current is supplied to relay 29 resulting in switch 95 opening and motor 24 stopping.

The left hand portion of switch 132 is a "sequence make before break" switch and is connected to ground by wire 172, wire 172 being momentarily grounded during swinging movement of switch 132 by engagement of fixed contact 173 with pivotally mounted armature 133 followed by breaking of the ground connection by reason of armature 133 being moved to the left by engagement with switch 132. Momentary grounding of wire 174 occurring by reason of the momentary grounding of wire 172 results in de-energizing relay 139, causing locked up switch 175 to drop out of engagement with contact 176 to open position and return of switch 140 upwardly to its original upper position in engagement with contacts 141 and 142 (corresponding to clockwise rotation of motor 24 and hence deflector plate 25). Fixed resistor 177 joined to wires 102 and 174 limits the current on momentary grounding of wire 174 thereby preventing excessive flow of current through battery 100 with attendant damaging of the battery. The deflector plate cycle for sampling the solid material pieces and non-sampling is now completed.

When all the solid pieces have gravitated from the upper portion of elevator conveyor 16 onto the widest spaced apart bars 35 of rotary screening device 17 (shown in FIG. 1) of the first screening station, detecting flap 26 moves to its vertical position as shown whereby its upper metallic portion 150 moves out of engagement with contact 151 thereby de-energizing slow release relay 27, whereby four pole switch 155 moves upwardly with its two lower armatures 156 and 157 moving out of engagement with contacts 158 and 159 respectively and its two upper armatures 161 and 162 moving into engagement with contacts 163 and 164 respectively. Momentary return of flap 26 to the vertical position shown during intervals between contact with the solid pieces will not cause upward opening movement of switch 155 by reason of the built in delay in conventional slow release relay 27, such relays being typically made to hold a switch for a period of several seconds before releasing same. The engagement of the two upper armatures 161 and 162 of switch 155 with contacts 163 and 164 respectively moves pivotally mounted armatures 180 and 181 out of engagement with contacts 182 and 183 respectively (conventional "make before break") resulting in temporary grounding of line 192, energizing of relay 193 resulting in momentary opening of switch 194, de-energizing of relay 109 with release and opening of switch 113 which was locked down to contacts 118 and 122, and temporary grounding of line 184. Such temporary grounding of line 184 causes printer-counters 69 and 79 for the first and second screening stations respectively to print the total number of pieces of the size fractions that fell from the rotary screening devices and thereafter to "clear" or return to zero, thereby placing the printer-counters in readiness for the next screening and strength testing cycle. Line 184 connects contact 183 and battery 185, battery 185 being connected to printer-counters 69 and 79 by lines 186 and lines 187 and 188 respectively. Printer-counters 69 and 79 are connected to printer-counter actuators 66 and 78a respectively by lines 68 and 68a and are grounded by wires 189 and 190 respectively. Printer-counter actuators 66 and 78a are connected to their corresponding capacitors by lines 67 and 67a. Relay 193 is connected to battery 195 by line 196, battery 195 being grounded by line 197. The opening of switch 113 results in opening of switch 115 thereby stopping motor 19 for the elevator conveyor, stopping motors 41 and 128 for the first and second station rotary screening devices, and shutting off power supply to the printer-counter actuators. The cycle is thereby completed and the system is placed on "standby" for the next screening and strength testing cycle and awaiting another pulse from timer 22 operating switch 89.

Referring to FIG. 8, steel plates 55 and 56 form one of the capacitors of the counting means of this invention. Insulator plate 57 supports smaller conductor plate 55, and conductor plate 56 is grounded by wire 208. Capacitor plate 55 is connected by wires 67 and 210 to fixed capacitor 211 which in turn is connected to variable capacitor 212 by wire 213, the variable capacitor being connected to radio frequency inductance coil 214 by wires 215 and 216. The printer-counter actuator electrical and electronic components are housed in box 217. Variable capacitor 218 is connected by wires 220 and 219 to respectively inductance coil 214 and wires 67 and 210. Fixed capacitor 211, variable capacitor 212, radio frequency inductance coil 214 and variable capacitor 218 together with their interconnecting wires constitute a tank circuit 228.

Fixed capacitor 221 is connected by wires 222 and 215 to variable capacitor 212 and by wires 222 and 216 to radio frequency inductance coil 214 of the tank circuit, capacitor 221 also connected by wire 223 to wire 224 connecting plate 225 of electron tube 226 to radio frequency choke coil 227. Electron tube 226 comprises plate 225, grid 229, cathode 230 and filament 231 for heating the cathode. Wires 232 and 233 interconnect cathode 230 and inductance coil 214. Fixed resistor 235 is connected to wires 233 and 232 and also to fixed resistor 236 by wires 237 and 238 respectively. Grid 229 of electron tube 226 is connected by wire 239 to fixed resistor 240 which in turn is connected to lines 237, 238 and 270, line 270 being connected to wire 213. Fixed resistor 236 is connected by wires 242 and 243 to fixed capacitor 244, capacitor 244 being connected by wire 245 to choke coil 227.

Relay 247 is connected by wire 248 to wire 245, which interconnects choke coil 227 and fixed capacitor 244. Switch 249 is normally open and upon energizing relay 247, switch 249 is drawn into engagement with fixed contact 250 which is connected by line 68 to printer-counter 69, the printer-counter being connected to ground by line 189. The circuit causing the printer-counter to print and reset to zero at the end of the test period (not shown in this figure) is shown in detail in FIG. 7.

Step-up transformer 256, which provides increased voltage for the electronic relay circuit, comprises primary coil 257 and secondary coils 258 and 259 connected by line 260, primary 257 being connected by lines 262 and 263 to a power source such as a 115 volt alternating current power source. Secondary coils 258 and 259 are grounded by line 262. Line 264 connects secondary 258 and line 262, line 266 connecting lines 264 and 265 to relay 247. Secondary 259 is connected by line 267 to filament 231 of electron tube 226, filament 231 being in turn connected to ground.

When a piece of solid material, for instance coke, falls between the capacitor plates 55 and 56 with the plates electrically charged, the capacitance is varied which results in changing of the resonant frequency of tank circuit 228. The changed resonant frequency in turn results in changing of the voltage on grid 229 of electron tube 226 thereby changing the plate current whereby relay 247 is energized. The energized relay 247 draws switch 249 into engagement with fixed contact 250 thereby completing the circuit and actuating printer-counter 69. The actuation of printer-counter 69 causes the printer-counter to count the number of coke pieces falling between capacitor plates 55 and 56. At the end of the test period the circuit shown in FIG. 7 causes the printer-counter to print the total number of pieces counted on a tape. The plate current of electron tube 226 is supplied by the secondary coils of transformer 256 which supplies increased voltage to plate 225, such as about 260 volts when the voltage supplied to the primary is 115 volts.

Referring to FIG. 9, metallic container 59, for instance of steel has cylindrical side wall 270, open top inlet 271 and bottom discharge outlet 272 normally closed by dump door 60. If desired, the container side wall could be of rectangular or other shape and be made of other metal, e.g. cast iron. Metallic funnel 62 is supported over the container by any suitable supporting means well known in the art, the funnel lower tubular portion 63 extending downwardly a short distance typically one inch within the upper portion of container 59 and spaced from the container side wall. Dump door 60 is hinged to the side wall of the container by hinge 273, coil spring 274 being attached at one end to floor or platform 275 and at its other end to dump door end portion 277 for urging dump door 60 in normally closed position at the container bottom. Arcuate rod 64 of iron is affixed at one end, for instance by welding, to the lower surface of dump door 60, the opposite end of rod 64 being free and unattached. Solenoid 61 is also of arcuate shape similar to that of rod 64 for receiving rod 64 when the solenoid is energized, and rod 64 is drawn within the solenoid by magnetic attraction.

Tubular portion 63 of funnel 62 is connected by line 278 to battery 279, line 280 connecting battery 279 to relay 282. Relay 282 is also connected to container 59 by wire 283. Armature 284, upon energizing of relay 282, is drawn into engagement with fixed contacts 285 and 286, contact 285 being connected by line 287 to battery 288 which in turn is connected to solenoid 61. Solenoid 61 is connected to ground by wire 290. Contact 286 is connected by wire 291 to battery 292, battery 292 being connected to conventional printer-counter 293 similar to the printer-counters previously mentioned. Battery 185 is connected to printer-counter 293 by lines 186 and 187, line 184 connecting battery 185 to the circuit means previously described in detail with respect to FIG. 7. Printer-counter 293 is connected to ground by wire 294.

When such an amount of the smallest size fraction coke pieces accumulates in metallic container 59 as to bridge the gap between funnel tubular portion 63 and the side wall of container 59, the circuit comprising metallic funnel 62, wire 278, battery 279, wire 280, relay 282, wire 283 and metallic container 59 is closed by reason of the coke pieces causing current to flow from battery 279 to relay 282 to energize the same. The energized relay draws armature 284 into engagement with fixed contacts 285 and 286 to close the corresponding circuits. Solenoid 61 is thereby energized and draws curved rod 64 within the solenoid thereby swinging dump door 60 open whereby the coke pieces fall from the container. Simultaneously with the energizing of solenoid 61 and opening of dump door 60, printer-counter 293 is actuated to count the number of times container 59 is filled with the smallest size fraction pieces. At the end of the test period printer-counter 293 is actuated through lines 187, 186, battery 185, line 184 and other circuit means described in detail with respect to FIG. 7, to print the total number of times on a tape and reset the counter to zero.

Discharge of the pieces from container 59 when dump door 60 is open effects breaking of the circuit and hence de-energizing of relay 282, whereby armature 284 moves out of engagement with fixed contacts 285 and 286 leaving the same in their normally open position. The result is de-energizing of solenoid 61 with iron rod 64 being free to move out of the solenoid 61 whereby spring 274 exerts force to swing dump door 60 upwardly to its normally closed position. Printer-counter 293 is de-actuated simultaneously with the closing of the dump door.

In operation of the sampling, screening and strength testing apparatus of the present invention, for instance with coke as the solid material being sampled, screened and tested, the coke of non-uniform size pieces are conducted by belt conveyor 15 to detecting flap 20. The size of the solid pieces will range from typically about ¼ inch—15 inches in the case of the coke, and from typically about ⅛ inch—15 inches with sintered ore. With other materials the size of the pieces may be greater than the 15 inches. The coke has been previously supplied to conveyor 15 from the wharf or other suitable source of supply, conveyor belt 15 typically handling the full production at the coke plant. The coke pieces engage and move flap free end portion 21 upwardly whereby upper metallic portion 83 of flap 20 engages fixed contact 84, shown in FIG. 7, to close to circuit. With flap metallic portion 83 engaging contact 84 and with current being delivered to drive motor 18 of conveyor 15, timer motor 23 of timer 22 and hence timer arm 87 make one complete counterclockwise revolution per hour whereby flap 88 on arm 87 engages and momentarily closes double pole switch 89 to start one sampling and testing cycle for each hour of operation of conveyor 15 while it is carrying coke. As long as coke pieces keep flap metallic portion 83 in engagement with contact 84 to close the circuit and electric power is delivered to drive motor 18 by lines 81, the timer motor 23 operates and with every revolution the momentary closing of switch 89 results in starting operation of two-speed motor 19 and its elevator conveyor 16 at its faster speed and operation of drive motors 41 and 128 and hence first station rotary screening device 17 and second station rotary screening device 76, and in starting operation of reversing motor 24 for moving deflector plate 25 from its vertical non-sampling position to its inclined sampling position.

With deflector plate 25 in its inclined sampling position, all of the coke pieces discharging from the end of conveyor 15, i.e. a representative sample of the total coke being produced in the plant is diverted onto the lower end portion of elevator belt conveyor 16. The coke pieces are carried upwardly on elevator conveyor 16 until the coke engages and moves flap end portion 26a upwardly, whereby flap upper metallic portion 150 is moved into engagement with fixed contact 151 shown in FIG. 7. Slow release relay 27 is thus energized whereby four pole switch 155 is drawn downwardly with its two lower electrodes 156 and 157 moving into engagement with fixed contacts 158 and 159. The result is slowing down of two-speed motor 19 and its elevator conveyor 16 to its slower speed, and start up of motor 24 in counterclockwise rotation to return deflector plate 25 to its vertical non-sampling position allowing production coke from conveyor 15 to fall to another belt or chute (not shown).

The coke pieces gravitate from the upper end portion of elevator conveyor 16 downwardly onto widest spaced apart bars 35 of rotary screening device 17 of first screening station 30. The largest size pieces corresponding to the spacing between bars 35, which pieces are of above 12 inch size when bars 35 have 12 inch spacing, are retained on the outer surfaces of bars 35, and the smaller size pieces pass between the bars into chamber 36 wherein they are caught by chute 37 and delivered through inlet opening 49 in disk 44 into receptacle 48 defined by the inner barrier of bars 45. The fraction of largest size pieces retained on bars 35 fall downwardly between plates 55 and 56 of capacitor 54 and vary the capacitance of capacitor 54, whereby printer-counter actuator 66 comprising the electronic relay circuit previously described actuates printer-counter 69 to count and at the end of the test to record by printing on a tape the number of pieces in this largest size fraction. The largest size fraction pieces then fall downwardly onto inclined plate 73 as do the other size fraction pieces hereafter described whereby they are subjected to sudden impact stresses, generally fracturing some of the pieces, the resulting fractured and unfractured pieces falling over lower edge 74 of plate 73.

The pieces within receptacle 48 are separated into four size fractions, the larger size pieces not passing between inner barrier bars 45 rolling and sliding downwardly on the bars 45 and falling from the ends of bars 45 downwardly between the plates 55 and 56 of capacitor 51 for counting. If desired, the solid material pieces could be separated into from 2–10 size fractions or even a greater number of size fractions by the separating of the first and second screening stations. Of the pieces falling between inner barrier bars 45, the next smaller size pieces are retained on bars 47 of the intermediate barrier and are discharged from the terminal ends of bars 47 to fall downwardly between charged plates 55 and 56 of capacitor 52 for counting. Of the coke pieces which fall between intermediate barrier bars 47, the next smaller size fraction pieces are retained on most narrowly spaced bars 46 of the outer barrier and roll and slide downwardly on bars 46 to fall from the ends of these bars downwardly between plates 55 and 56 of capacitor 53 to be counted. The smallest size fraction pieces falling between outer barrier bars 46 are caught by metallic funnel 62 and conducted into solenoid-operated metallic drop bottom container 59 where the quantity of such smallest size fraction pieces is determined as previously described. The smallest size fraction pieces fall from container 59 when dump door 60 is opened and are collected in chute 65 for discarding or use as desired. When the inner barrier bars 45 are spaced apart 8 inches at the inlet extremity and 9 inches at the opposite extremity, the fraction of coke pieces falling from the terminal ends of bars 45 is composed of pieces of about 9–12 inches size. When intermediate barrier bars 47 are spaced apart 5 inches at the inlet extremity and 6 inches at the opposite extremity, the fraction of pieces falling from the terminal ends of bars 47 is made up of pieces of about 6–9 inches size. With outer barrier bars 46 spaced 3 inches part at the inlet extremity and 4 inches apart at the opposite extremity, the fraction of coke pieces falling from the terminal ends of bars 46 is composed of pieces of about 4–6 inches size and the fraction of smallest size pieces falling between the body portion of bars 46 is composed of pieces of less than 4 inch size.

The pieces of the size fractions falling from the ends of inner barrier bars 45, intermediate barrier bars 47 and outer barrier bars 46 gravitate downwardly between the spaced apart plates of capacitors 51, 52 and 53 respectively whereby the capacitance of each capacitor is varied. The corresponding printer-counter actuators 66 are thereby operated to actuate the corresponding printer-counters 69 to count the number of pieces in each size fraction. The pieces of each of the size fractions except the smallest size fraction then fall downwardly to strike inclined plate 73 whereby the pieces are subjected to sudden impact stresses, generally fracturing some pieces. The resulting fractured and unfractured pieces along with the previously mentioned largest size fraction fractured and unfractured pieces then fall from plate lower edge 74, and are conducted by guide plate 75 onto the widest spaced apart bars of rotary screening device 76 of second screening station 77, rotary screening device 76 having structure and operating substantially identical to the structure and operation respectively of first station rotary screening device 17. The coke pieces are separated by screening device 76 into size fractions substantially identical to the size fractions of rotary screening device 17.

The pieces of each of the size fractions fall from the bars of screening device 76 and gravitate downwardly between spaced apart charged plate 297 and grounded plate 298 of side by side capacitors substantially identical to the capacitors of counting means 31, whereby the capacitance of these capacitors is varied and hence printer-counter actuators 78a are operated to actuate printer-counters 79 to count and print the number of pieces of each size fraction on a tape. The smallest size fraction pieces falling between the body portion of the most narrowly spaced outer barrier bars of screening device 76 are caught by metallic funnel 72 and conducted into solenoid-operated drop-bottom metallic container 70 substantially identical in structure and operation to that of solenoid-operated drop-bottom container 59. Funnel 72 and drop-bottom container 70 are in circuit and have the structure and operate substantially identical to the circuitry, structure and operation of funnel 62 and drop-bottom container 59 shown in detail in FIG. 9, and its printer-counter records at the end of the test period by printing on a tape the number of times container 70 is filled with the smallest size fraction pieces.

The number of pieces of the corresponding size fractions, exclusive of the smallest size fraction, of each of the first and second screening stations are compared and the quantity of pieces of the smallest size fraction of each of the first and second screening stations are also compared. This comparison is a measure of the strength of the coke or other solid material pieces being sampled and supplied to the system. With coke of good strength, the quantity of small coke produced by the impact on plate 73 is considerably less than when weak coke is dropped.

The rotary screening devices of this invention, such as rotary screening device 17 is not only eminently adapted for use in the screening and strength testing apparatus of this invention but can also be used separate and apart from the other apparatus of the invention for screening the solid material pieces into the desired size fractions. Further, the apparatus for automatically sampling the solid material pieces can also be used separate and apart from the other apparatus of the invention, and the apparatus for receiving and determining the quantity of smallest size fraction pieces can also be used apart from the other apparatus for receiving and determining the quantity of solid material pieces and particles capable of conducting electricity, e.g. coke or metallic pieces.

The following example is illustrative of the present invention and not restrictive thereof, the apparatus employed being shown in FIGS. 1, 7, 8 and 9.

Foundry coke pieces from the wharf were conducted by belt conveyor 15 to detecting flap 20, conveyor 15 operating at a speed of 6 feet per second. The foundry coke pieces moved the flap lower end portion 21 upwardly causing upper metallic portion 83 of the flap to engage a fixed contact 84 to close the circuit previously described. With the upper metallic portion 83 of flap 20 engaging the fixed contact and with electric current passing to drive motor 18 of conveyor 15, the timer motor 23 of timer 22 and hence the timer arm 87 made one complete counterclockwise revolution per hour whereby flap 88 on arm 87 engaged and momentarily closed double pole switch 89 to start a sampling and testing program at least once an hour of operation of conveyor 15 on foundry coke. The engagement of flap metallic portion 83 with contact 84 and the delivery of electric power to drive motor 18 by lines 81 together result in the driving of timer motor 22 which once per revolution momentarily closes switch 89 causing operation of two-speed motor 19 and its elevator conveyor 16 at its faster speed of 900 r.p.m., as well as operation of drive motors 41 and 128 and hence rotary screening devices 17 and 76 of the first and second screening stations, and in starting operation of reversing motor 24 which moved deflector plate 25 from its vertical non-sampling position to its inclined sampling position. All of the coke pieces discharging from the end of conveyor 15 were diverted by deflector plate 25 in its inclined sampling position onto the lower end portion of elevator conveyor 16 operating at its faster speed. The operation of conveyor 16 at its faster speed during the sampling enabled a representative sample of the coke to be diverted onto conveyor 16 without piling up of the pieces on conveyor 16 with attendant falling of the pieces from the conveyor and blocking and interfering with the sampling, resulting in a non-representative sample remaining on conveyor 16 for delivery to the first screening station. The coke pieces were elevated by conveyor 16 operating at its faster speed until a coke piece engaged and moved end portion 26a of detecting flap 26 upwardly, causing movement of the flap upper metallic portion 150 into engagement with fixed contact 151. The result was slowing down of elevator conveyor 16 to its slower speed of 450 r.p.m., and start-up of motor 24 in counterclockwise rotation for returning deflector plate 25 to its non-sampling position.

The coke pieces fell from the upper end of conveyor 16 running at its slower speed onto the widest spaced apart scalping bars 35 of rotating screening device 17 of the first station. The operation of elevator conveyor 16 at its slower speed once the conveyor belt is full of coke pieces and the sampling has been completed achieves delivery of the coke pieces to the scalping bars 35 in a slower and more gentle fashion thereby insuring good screening in accordance with the invention, and avoids piling up of the pieces on the scalping bars and the pieces bouncing and falling off the bars without being properly screened. The scalping bars were spaced apart 12 inches resulting in coke pieces of above 12 inch size being retained on the outer surfaces of bars 35, and the smaller size pieces passing between bars 35 into cage 36 where they were caught by chute 37 and conducted into cage or receptacle 48 defined by the inner barrier of bars 45. The fraction of pieces of above 12 inch size retained on the scalping bars 35 fell downwardly between the charged plates of capacitor 54 whereby printer-counter 69 was actuated to count and print on a tape the number of pieces in this fraction of above 12 inch size. The number of pieces of above 12 inch size was found to be 2.

The coke pieces of 12 inch size and smaller within rotating receptacle 48 were then separated into 4 size fractions, the bars 45 of the inner barrier being spaced apart 8 inches at the inlet extremity and 9 inches at the opposite extremity resulting in coke pieces of about 9–12 inch size falling from the ends of bars 45. The smaller size pieces fell between inner barrier bars 45 and pieces of about 6–9 inch size were retained on bars 47 of the intermediate barrier, bars 47 being spaced apart 5 inches at the inlet extremity and 6 inches at the opposite extremity. The still smaller coke pieces fell between intermediate barrier bars 47 and coke pieces of about 4–6 inch size were retained on bars 46 of the outer barrier, the outer barrier bars 46 being spaced apart 3 inches at the inlet extremity and 4 inches at the opposite extremity. The smallest size pieces fell between bars 46 of the outer barrier and were composed of pieces of less than 4 inch size. The fraction of 9–12 inch size pieces falling from the ends of the bars 45 fell downwardly between the charged plates of capacitor 51, the fraction of about 6–9 inch size pieces falling from the ends of intermediate barrier bars 47 fell downwardly between the charged plates of capacitor 52, the pieces of about 4–6 inch size falling from the ends of outer barrier bars 46 fell downwardly between the spaced apart plates of capacitor 53, and the smallest size pieces of less than 4 inch size falling between outer barrier bars 46 were caught by funnel 62 and delivered into solenoid-operated metallic drop-bottom container 59. Drop-bottom container had a capacity of 5 lbs. of the coke particles. The printer-counters for each of capacitors 51, 52 and 53 were actuated to count the pieces of each size fraction and print the results on a tape, the results being 4 pieces of about 9–12 inch size, 33 pieces of about 6–9 inch size and 50 pieces of about 4–6 inch size. The printer-counter for drop-bottom container 59 printed on its tape at the end of the test period that container 59 had been filled 18 times with coke pieces of less than 4 inch size.

The pieces of each of the size fractions, except the fraction of pieces less than 4 inches in size which were discarded, then fell downwardly to strike inclined shatter plate 73 fracturing some of the pieces. Plate 73 was positioned about 24 feet beneath the capacitors. The resulting fractured and unfractured pieces then fell from the lower edge 74 of plate 73, and were conducted by guide plate 75 onto the rotating widest spaced apart scalping bars of second station rotary screening device 76. Rotary screening device 76 had structure and operated substantially identical to the structure and operation respectively of first station rotary screening device 17. The coke pieces were separated by screening device 76 into size fractions substantially identical to the size fractions of rotary screening device 17, viz. size fractions of above 12 inch size pieces, about 9–12 inch size pieces, about 6–9 inch size pieces, about 4–6 inch size pieces, and below 4 inch size pieces. The pieces of each of the size fractions except the above 12 inch size pieces which were retained on the widest spaced apart scalping bars and except the below 4 inch size fraction fell from the ends of the bars of screening device 76 and fell downwardly between spaced apart charged plates of side by side capacitors substantially identical to the capacitors of counting means 31. The size fraction pieces below 4 inch size fell between the most narrowly spaced outer barrier bars of screening device 76 and were caught by metallic funnel 72 and conducted into solenoid-operated drop-bottom container 70 having substantially identical capacity for coke as container 59. The printer-counters 79 for each of the capacitors showed that the number of pieces in each size fraction was 1 for the above 12 inch size fraction pieces, 2 for the about 9–12 inch size fraction pieces, 25 for the about 6–9 inch size pieces, and 64 for the about 4–6 inch pieces. The printer-counter for the drop-bottom container 70 showed that this container had been filled 30 times with below 4 inch size coke pieces.

The difference in the number of pieces of the corresponding size fractions from the first and second station rotary screening devices showed that the coke was of medium strength. A considerably larger increase in the number of pieces of the small size fraction would have indicated a weaker coke, while a considerably smaller production of small coke would have indicated a stronger coke. The equivalent four inch A.S.T.M. shatter index (A.S.T.M. No. D141–48) for the test given above (calculated from the estimated weight of the various pieces) is 83. From this it can be concluded that with normal bulk handling and transporting of this coke, 83% will remain larger than 4 inch size.

Although certain preferred embodiments of the invention have been disclosed for purpose of illustration, it will be evident that various changes and modifications may be made therein without departing from the scope and spirit of the invention.

What is claimed is:

1. Apparatus for determining the strength of solid material composed of non-uniform piece sizes which comprises a first station including means for separating the solid material pieces into various size fractions, means for supplying said solid material pieces to said separating means for the separating, means for determining the quantity of solid pieces of the separate size fractions from the separating means, a hard surfaced member located beneath said quantity determining means for subjecting solid pieces falling therefrom to impact stresses, a second station including another separating means for separating the solid pieces received from the hard surfaced member into various size fractions similar to the size fractions from the first station separating means, and another quantity determining means for determining mining the quantity of solid pieces of the separate size fractions from the second station separating means.

2. Apparatus for determining the strength of solid material composed of non-uniform piece sizes which comprises a first station including screening means for separating a representative sample of the solid material pieces into various size fractions, means for obtaining a representative sample of said solid material pieces from a supply thereof, means for conveying the sample from the sampling means to said screening means for the separating, circuit means including counting means so arranged and disposed beneath the screening means as to count the pieces of the separate size fractions falling from the screening means and passing through said counting means, an inclined hard surfaced member located beneath said counting means for subjecting solid pieces falling therefrom to impact stresses and causing the pieces to fall over its lower edge, a second station beneath the hard surfaced member including another screening means for separating the solid pieces falling from the hard surfaced member lower edge into various size fractions similar to the size fractions from the first station screening means, and another circuit means including counting means similar to the first-mentioned circuit and counting means so arranged and disposed beneath the last-mentioned screening means as to count the solid pieces of the separate size fractions falling from the last mentioned screening means and passing through the last-mentioned counting means.

3. Apparatus for sampling, screening and determining the strength of coke comprising means for obtaining a representative sample of coke pieces from a supply thereof, a conveyor for transferring the coke piece sample from the sampling means for feeding onto screening means of a first screening station, the first station including said screening means for separating the sample into a fraction of larger size pieces retained thereon from smaller size pieces passing therethrough, a rotary screening device comprising spaced inner and outer concentric circular barriers and an intermediate circular barrier concentrically spaced between the inner and outer barriers, a receptacle defined by the inner barrier and having an inlet in an end portion thereof for the coke pieces passing through the first-mentioned screening means, the receptacle being of lesser diameter at its inlet end extremity than at its opposite extremity, each barrier of said screening device formed of a plurality of spaced apart straight bars spaced closer together at said inlet end extremity than at its other extremity, means mounting the bar ends of each barrier at the inlet end portion of the device, the bars of the inner barrier being widely spaced apart and of the greatest length, the bars of the outer barrier being most narrowly spaced apart and of the shortest length, and the bars of the intermediate barrier spaced apart a distance and having a length intermediate the distance of spacing and the length respectively of the inner and outer barrier bars for separating the smaller coke pieces into various size fractions in accordance with the spacing of the bars of the barriers, and means for feeding the smaller coke pieces passing through the first-mentioned screening means into the inlet end portion of the rotary screening device, circut means including an electronic relay circuit and counting means so arranged and disposed beneath the bars of said rotary screening device and said screening means as to count the pieces of the separate size fractions falling therefrom and passing through said counting means, an inclined hard surfaced plate disposed a substantial distance beneath said counting means for subjecting coke pieces falling from the counting means to sudden impact stresses and causing said pieces to fall over its lower edge, a second screening station beneath the inclined plate including another screening means and rotary screening device similar to the screening means and rotary screening device of the first station for separating coke pieces falling from the inclined plate into various size fractions similar to the size fractions from the screening means and the rotary screening device of the first station, and another circuit means including an electronic relay circuit and counting means similar to the first-mentioned circuit means and counting means so arranged and disposed beneath the bars of the second station rotary screening device as to count the coke pieces of the separate size fractions falling therefrom and passing through the last-mentioned counting means.

4. A rotary screening device adapted for separating a mixture of non-uniform size solid material pieces into different size fractions comprising a plurality of spaced circular barriers including spaced inner and outer concentric circular barriers and an intermediate circular barrier concentrically spaced between the inner and outer barriers, a receptacle defined by the inner barrier and having an inlet in the end portion thereof for solid material pieces to be screened, the receptacle being of lesser diameter at its inlet end extremity than at its opposite extremity, each barrier formed of a plurality of spaced apart bars spaced closer together at said inlet end portion than at the other end portion, means mounting the bar ends of each barrier at the inlet end portion of the device, a rotatable shaft affixed to said mounting means, the bars of the inner barrier being widely spaced apart, the bars of the outer barrier being most narrowly spaced apart and of shorter length than the length of the inner and intermediate wall bars, and the bars of the intermediate barrier spaced apart a distance and having a length intermediate the distance of the spacing and length respectively of the inner and outer barrier bars for separating the pieces into various size fractions in accordance with the spacing of the bars.

5. A rotary screening device adapted for separating a mixture of non-uniform size solid material pieces into different size fractions comprising a rotatable shaft, a plate mounted at an end of said shaft, a plurality of widest spaced apart, straight, parallel bars of similar length mounted at their ends in circular arrangement in the plate surface opposite its shaft mounting surface, said bars projecting therefrom to form an annular barrier defining a chamber therewithin, the bars separating larger size solid material pieces retained thereon from smaller size solid material pieces passing therebetween, a chute disposed within said chamber for pasage of the smaller size pieces to an inlet for a receptacle hereafter described, a second plate mounted at the ends of the bars opposite the first-mentioned ends, a plurality of spaced apart straight bars mounted at their ends at the second plate surface opposite its first-mentioned bar mounting surface, said bars being mounted and projecting from said second plate in such manner as to form spaced inner and outer concentric circular barriers and an intermediate barrier concentrically spaced between the inner and outer barriers, a receptacle defined by said inner barrier and having an inlet opening provided in said second plate for receiving the smaller size pieces from said chute, the receptacle being of lesser diameter at its inlet end extremity than at its opposite end extremity, the bars of each barrier being spaced closer together at the inlet extremity than at the other end portion, the bars of the inner barrier being widely spaced apart but narrower spaced than the first-mentioned bars, the bars of the outer barrier being most narrowly spaced apart and of shorter length than the length of the outer and intermediate barrier bars, and the bars of the intermediate barrier spaced apart a distance and having a length intermediate the distance of the spacing and the length respectively of the inner and outer barrier bars for separating the pieces into various size fractions in accordance with the spacing of the bars.

6. Apparatus for automatically sampling solid material pieces comprising a first conveyor for conveying a sample of solid material pieces, a variable speed motor for driving the first conveyor, a second conveyor for the solid material pieces having its discharge end spaced adjacent an end portion of the first conveyor, another motor for driving said second conveyor, detecting means spaced over the discharge end portion of said second conveyor and movable by solid material pieces thereon, a reversing motor and a deflector plate, a timer in circuit with said detecting means for operating the variable speed motor and hence the first conveyor at a faster speed, and for starting operation of the reversing motor for moving the deflector plate into a sampling position when a solid material piece engages and moves said detecting means to close the circuit, the deflector plate pivotally mounted between said end portion of the first conveyor and the discharge end of said second conveyor, the reversing motor for moving the deflector plate into and out of the sampling position for diverting onto the first conveyor end portion the solid material pieces discharging from the discharge end of said second conveyor, another detecting means spaced over the opposite end portion of the first conveyor movable by solid material pieces thereon, a first relay operable under the control of the last-mentioned detecting means, second and third relays operable under the control of the first relay, said first conveyor variable speed motor and deflector plate reversing motor being operable under the control of said second and third relays respectively, the last-mentioned detecting means being engaged and moved by a solid material piece on the first conveyor to close a circuit thereby energizing the first relay and hence the second and third relays to cause the variable speed motor and hence the first conveyor to operate at its slower speed and the reversing motor to move the deflector plate out of its sampling position.

7. Apparatus for automatically sampling solid material pieces comprising an upwardly inclined endless belt conveyor for elevating a sample of solid material pieces, a variable speed motor for driving the elevator conveyor, a second endless belt conveyor for the solid material pieces having its discharge end spaced above the lower end portion of the elevator conveyor, another motor for driving said second conveyor, a detecting member closely spaced over the discharge end of said second conveyor and movable by solid material pieces thereon, a reversing motor and a deflector plate, a timer in circuit with said detecting means for operating the variable speed motor and hence the elevator conveyor at a faster speed and for starting operation of the reversing motor for moving the deflector plate into an inclined sampling position when a solid material piece engages and moves said detecting means to close the circuit and electric current is being delivered to said second conveyor drive motor, the deflector plate pivotally mounted between the lower end portion of the elevator conveyor and the discharge end of said second conveyor, the reversing motor for moving the deflector plate into and out of the inclined sampling position for diverting onto the elevator conveyor lower end portion substantially all solid material pieces discharging from the discharge end of said second conveyor, another detecting member closely spaced over the upper end portion of the elevator conveyor movable by solid material pieces thereon, a first relay operable under the control of the last-mentioned detecting member, second and third relays operable under the control of the first relay, said elevator conveyor variable speed motor and deflector plate reversing motor being operable under the control of the second and third relays respectively, the last-mentioned detecting member being engaged and moved by a solid material piece on the elevator conveyor to close a circuit thereby energizing the first relay and hence the second and third relays to cause the variable speed motor and hence the elevator conveyor to operate at its slower speed and the reversing motor to move the deflector plate out of its inclined sampling position.

8. Apparatus for receiving and determining the quantity of solid material pieces comprising a metallic funnel for receiving and conducting electrically conductive solid material pieces into a metallic container, an electrical circuit which includes the container and funnel, the metallic container disposed beneath the funnel and having a top inlet and a bottom discharge outlet, a solenoid operated dump door hinged to the lower portion of the container side wall, spring means normally urging the dump door to close the discharge outlet, a relay operable under the control of the last-mentioned circuit, a counting device operable under the control of the relay, the solenoid also being operable under the control of said relay, the solid pieces accumulating in the container to ultimately bridge the gap between the container side wall and the funnel lower wall to close the circuit to energize said relay thereby energizing the solenoid, the energized solenoid causing opening movement of the dump door against the action of the spring means, the counting device being operated simultaneously with the opening of the dump door to count the number of times the container is filled with the solid material pieces.

9. Apparatus for receiving and determining the quantity of particulate coke which comprises a metallic funnel for receiving and conducting the coke particles into a metallic container, an electrical circuit which includes the container and funnel, the metallic container disposed directly beneath the funnel and having an open top inlet and a bottom discharge outlet, the funnel lower tubular portion extending a short distance into the upper portion of the container with the funnel lower tubular wall spaced from the container side wall, a solenoid operated dump door hinged to the lower portion of the container side wall, a spring connected to the dump door and normally urging the dump door to close the discharge outlet, a magnetizable metallic rod affixed at one end to the dump door, a relay operable under the control of the circuit, the solenoid adapted to attract and receive the rod therewithin when energized and operable under the control of said relay, a counting device also operable under the control of said relay, the coke particles accumulating in the container to ultimately bridge the gap between the container side wall and the funnel lower tubular wall to close the circuit to energize said relay thereby energizing the solenoid, the energized solenoid drawing the rod therewithin and causing opening movement of the dump door against the action of the spring, the counting device being operated simultaneously with the opening of the dump door to count and record the number of times the container is filled with the coke particles.

References Cited in the file of this patent

UNITED STATES PATENTS

| | | |
|---|---|---|
| 523,731 | Potter | July 31, 1894 |
| 1,677,862 | Herrold | July 17, 1928 |
| 1,820,381 | Eavenson | Aug. 25, 1931 |
| 2,110,014 | Donnellan | Mar. 1, 1938 |
| 2,868,014 | Lapeyre | Jan. 13, 1959 |